Figure 1:
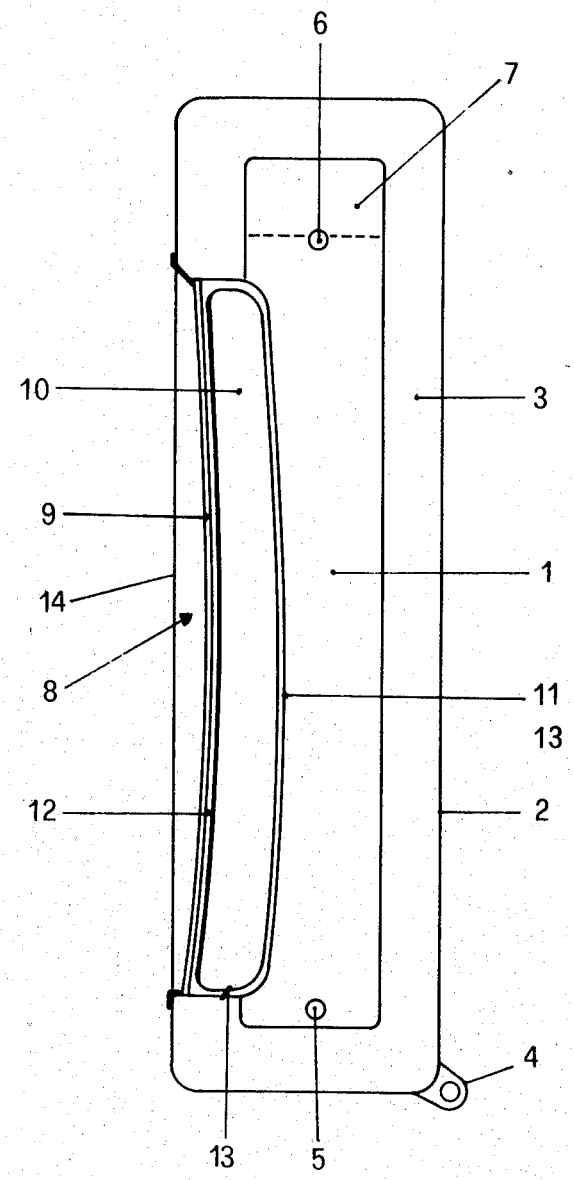

United States Patent [19]

Bianchini

[11] 4,350,145
[45] Sep. 21, 1982

[54] SOLAR COLLECTOR FOR HEATING PURPOSES

[75] Inventor: Giuliano Bianchini, Narni, Italy

[73] Assignee: Societa Italiana Brevetti, Rome, Italy

[21] Appl. No.: 229,987

[22] Filed: Jan. 30, 1981

[51] Int. Cl.³ .............................................. F24J 3/02
[52] U.S. Cl. .................................. 126/434; 126/435; 126/450
[58] Field of Search ............... 126/417, 419, 434, 435, 126/444, 445, 446, 447, 448, 450, 901, 430, 436, 437

[56] References Cited

U.S. PATENT DOCUMENTS

| | | | |
|---|---|---|---|
| 2,388,940 | 11/1945 | Taylor | 126/434 |
| 3,987,782 | 10/1976 | Meier | 126/434 |
| 4,003,367 | 1/1977 | Wikholm | 126/434 |
| 4,033,325 | 7/1977 | Walker | 126/434 |
| 4,050,508 | 9/1977 | Buckley | 126/434 |
| 4,084,578 | 4/1978 | Ishibashi | 126/437 |
| 4,149,589 | 4/1979 | Hopman | 126/434 |
| 4,192,290 | 3/1980 | Jensen | 126/437 |
| 4,213,448 | 7/1980 | Hebert | 126/436 |
| 4,245,617 | 1/1981 | Buckley | 126/434 |
| 4,294,229 | 10/1981 | Maloney | 126/434 |

Primary Examiner—Daniel J. O'Connor
Attorney, Agent, or Firm—Staas & Halsey

[57] ABSTRACT

A solar collector transfers the thermal energy of solar radiation to a liquid which acts as thermal vehicle, said liquid being moved by a thermo-convective action in a closed circuit so transferring through heat exchange the absorbed heat to a fluid contained in a vessel. This solar collector, compact in structure and low in cost, is provided with a valve which is apt to allow said thermo-convective action of the liquid in one sense, while blocking it in the opposite sense.

10 Claims, 2 Drawing Figures

SOLAR COLLECTOR FOR HEATING PURPOSES

This invention relates to a solar collector for heating fluids, particularly water for domestic uses.

Because of the shortage of energy sources which exists today, modern technology is continuously working on research programs seeking new forms of energy, among which the thermal energy from solar radiation is drawing considerable interest.

Apparatus for heating water which use solar energy to this end are well known in the prior art.

Such apparatus comprise, generally, a surface which is apt to absorb said radiating energy which is converted into thermal energy to be transferred to groups of tubes carrying water which is caused to circulate in a closed circuit and the thermal energy of which is transferred, through a heat exchanger, to the water to be used contained in a storage tank.

The prior art also teaches of an apparatus in which the thermal energy developed by a surface exposed to solar radiation is transferred to a system which comprises two immiscible liquids contained in a sealed container, said liquids being heated through circulation caused by convective movements, the thermal energy accumulated in the overfloating liquid being transferred through heat exchange to the circuit of the water to be used. However, production of such apparatus presents disadvantages of structural complexity, low efficiency, heavy heat loss and high costs.

Particularly with apparatus of the first previously mentioned type, among the disadvantages limiting their extensive use there is the high thermal inertia of the water used for the primary circuit, said inertia not allowing to obtain a high thermal exchange efficiency due to the small temperature differential obtainble for a given quantity of absorbed thermal energy. Furthermore, the large amount of steel required for their construction keeps their cost, dimensions and the amount of primary energy required for the production of steel material, at high levels with the consequence that an extensive use of such apparatus would jeopardize the actual saving of energy with respect to the total energy balance.

The second cited prior art apparatus shows disadvantages of low thermal efficiency also, though they make use of liquids having a low thermal inertia, since due to the necessity of direct thermal exchange between the liquids, a high mass or volume of the liquids is required, so that the advantage of using said low thermal inertia liquids is counter-balanced by the disadvantage of having to use large volumes which eventually leads to a high total thermal inertia.

It is the object of this invention to provide a solar collector for heating fluids, particularly water, characterized by structural simplicity, high efficiency, negligible loss of accumulated heat, both during the night and in absence of sunlight, ease of installation and relatively low in cost, which offers, in an extremely simple way, all the advantages of conventional solar collectors for hot water production plants or the like, eliminating their disadvantages.

According to the present invention, a solar collector for heating a fluid by transforming solar radiation energy into thermal energy, comprises in combination:

a body made of thermal insulating material having a reduced thickness with respect to the height and width thereof;

a coating of impervious material tightly fitting on said body and which has front, rear, upper and lower surfaces, said coating being provided with grooves on said surfaces, said grooves having a substantially vertical direction at said front and rear surfaces;

a plate of material which allows solar energy to be transferred from the one surface to the other surface thereof, said plate being juxtaposed on said front surface of said coating, substantially in contact with the peaks of said grooves, so that between said plate and said coating substantially vertical passages are defined;

a supporting frame including walls juxtaposed on said upper, rear and lower surfaces of said coating, substantially in contact with the peaks of said grooves, so as to define passages between said walls and said surfaces, said supporting frame being formed in coincidence with said rear surface, of a good heat conducting material, said supporting frame being also fluid tight sealed with the side faces of said body and with the perimeter of said plate, said supporting frame being part of a housing which defines a closed chamber;

a liquid having a low thermal capacity and a high thermal expansion coefficient, which fills said passages between the plate, the supporting frame and said coating;

a check valve element, which in the one position allows flow of said liquid through said passages in an upward direction along said front surface and in a downward direction along said rear surface, while in the other position it inhibits a flow of said liquid in the opposite directions; and a fluid contained in said housing, in heat exchanging relationship with said wall of the supporting frame in coincidence of said rear surface of the coating, whereby the radiating energy of the sun, transferred through said plate and absorbed as heat by said liquid, causes a temperature and volume differential to be established in said liquid, said differential driving a continuous flow of said liquid towards the heat exchanging wall of said supporting frame, resulting in a heat transfer to the fluid contained in said housing, an inverse heat transfer process being inhibited by said check valve.

The invention will become more apparent from the following description and the accompanying drawings which represent a preferred and illustrative embodiment of the invention.

Figure 2:
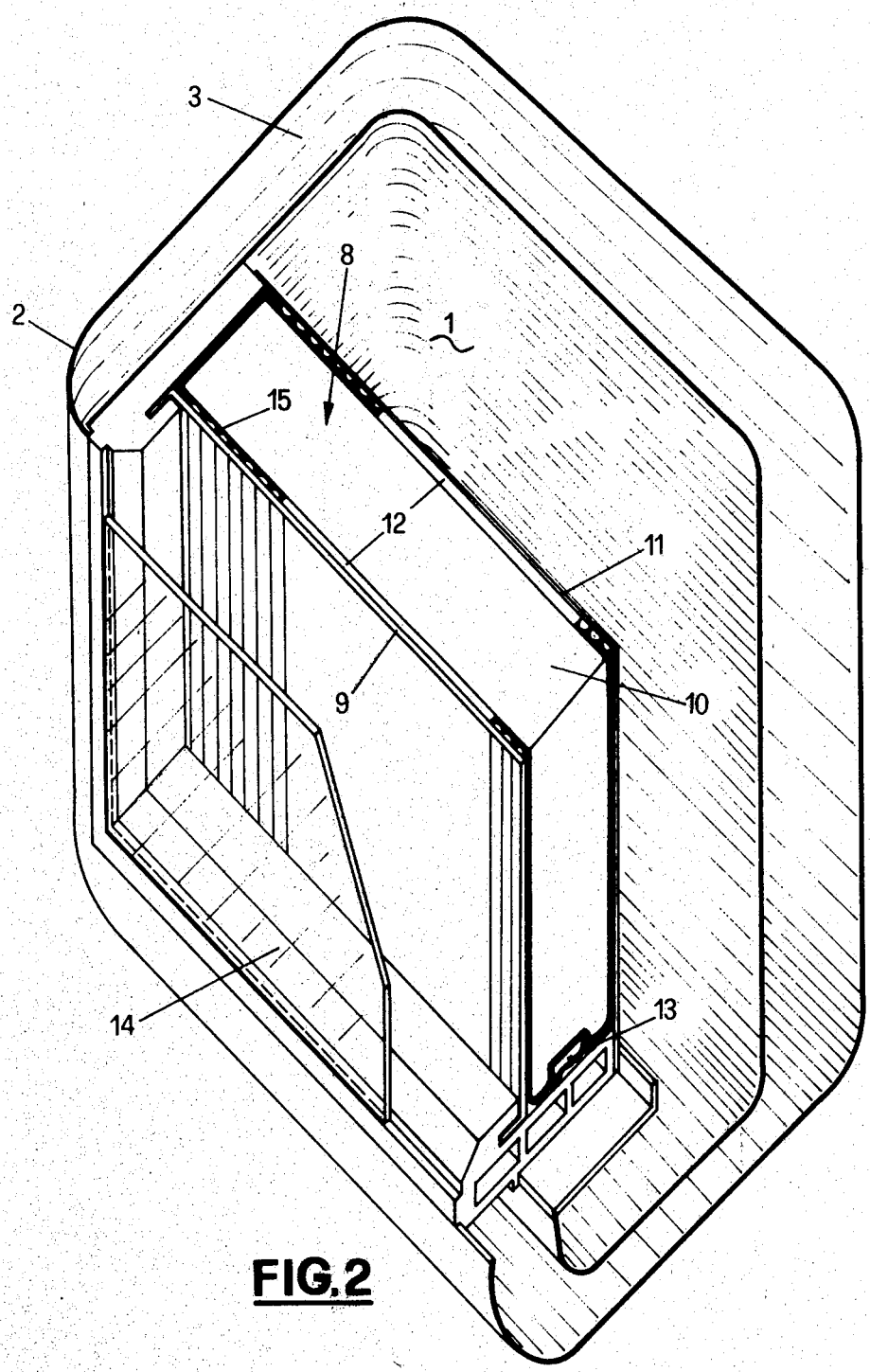

In the drawings:

FIG. 1 is a schematic side elevation in transversal section of a solar collector according to the invention; and FIG. 2 is an isometric fragmentary view with upper and side parts removed illustrating the structure of the solar collector in more detail.

Referring now to the drawings, the numeral 1 denotes generally a closed chamber or vessel containing a fluid to be heated which will be referred to hereinafter as "water".

Vessel 1 is formed of an essentially parallelepipedal shaped housing made of a material which is apt to withstand the effect of temperatures up to at least 98° C. and that can resist water pressure.

Said housing comprises a shell 2 having a gap 3 filled with insulation material in order to avoid heat losses towards the outside ambient.

The outer shell 2 is made of a material which can withstand high and low ambient temperatures, is weather proof and which is not affected by ultra violet rays, and is provided with the necessary devices, for example supporting brackets 4, for fixing to a wall or other outside supporting member or for fixing directly to the ground, preferably in a vertical position and at a slight angle.

The vessel 1 is further provided with a lower cold water inlet 5 and an upper hot water outlet 6, above which a closed space 7 is provided to allow expansion of the heated water.

Said outer shell 2 on its front, i.e. on its side facing the sun, presents a recess in which the solar collector 8 according to the invention is inserted.

The elements which form the solar collector 8 are supported by said shell 2 which therefore defines a supporting frame. Said recess for inserting the solar panel is closed on the back by a wall 11 of heat conducting material, for example metal, particularly a copper alloy, which is fixed to the shell 2.

The solar collector 8 comprises, as viewed from the front side to the rear side, a plate 9, a panel 10, the wall 11, and a continuous gap or passage 12, which surrounds said panel 10, said passage containing a liquid which acts as a thermal vehicle.

Preferably on the front of the solar collector 8 and closing the opening of said recess, a further plate 14 is provided, such as a window pane or other transparent material, including plastic, said plate 14 serving the purpose of admitting solar radiation and inhibiting heat losses from the plate 9 itself.

The plate 9 can be made of transparent glass, plastic or the like or an opaque sheet and serves the double purpose of allowing the transfer of solar energy and of containing the liquid vehicle.

Although it is preferable that the plate be of transparent material, in which case the surface of panel 10 is blackened, the characteristics of the solar collector according to the invention allow to use, as plate 9, a sheet of metal which is blackened on its outer surface, and in this case the liquid acting as thermal vehicle is heated by contact with said sheet of metal.

The panel 10, which has a relatively reduced thickness with respect to the height and width thereof, serves three purposes: the first is to absorb the maximum radiating energy from the sun to be imparted to the liquid acting as thermal vehicle to be converted into thermal energy, the second purpose is to avoid thermal losses from inside of vessel 1 towards the outside, the third purpose is to avoid infiltrations of the liquid acting as thermal vehicle (said panel being impervious) it also having to be slightly deformable for allowing expansion of the liquid due to temperature increase.

To this end, the panel 10 is made of thermally insulating material, its outward facing surface being of a color apt to absorb heat from the solar spectrum, in the case that plate 9 is transparent.

Preferably the panel 10 is formed of an internal body of expanded polyurethane, made impervious by applying on its perimetral surface, in contact with the liquid acting as thermal vehicle, a coating such as rubber applied in the liquid state with subsequent drying, or by wrapping said body in a tight fitting sheath as of neoprene or the like, making sure that said impervious coating, no matter how it may be obtained, has its surface facing towards solar radiation or front surface, adequately blackened.

The continuous passage 12 is present only at the front, upper, rear and lower surfaces of said panel 10. The side surfaces of said panel 10 are in direct and liquid tight contact with the supporting frame, or shell 2, so as to avoid a direct passage of the liquid thermal vehicle along said side surfaces of panel 10.

It is therefore not necessary that said coating be applied on said side surfaces of panel 10, as well. The surfaces of said panel, or of its coating, in direct contact with said liquid are provided with grooves 15, running vertically on the front and rear surfaces, said grooves 15 being present on the upper and lower surfaces as well, thus forming a plurality of continuous flow passages.

The supporting frame and the plate 9 which surround panel 10 are substantially in contact with the peaks of said grooves 15, so that the liquid thermal vehicle is impeded in the horizontal sense thus moving preferably along said grooves and following a closed path.

The depth of said grooves 15 is of a few millimeters, preferably about 2 millimeters, so that the volume or total mass of said liquid thermal vehicle is relatively small.

The wall 11 serves the purpose of transferring by conduction the thermal energy absorbed by the liquid to the water stored in vessel 1, besides aiding in confining the passage 12 for the liquid thermal vehicle.

Therefore said wall 11 has the function of a heat exchange surface. Particularly wall 11 is formed by a sheet of an impervious material which is a good heat conductor, and sufficiently resistant to the pressure of the stored water.

Preferably, said wall 11 is made of a metal plate of appropriate thickness.

The liquid acting as thermal vehicle is a liquid which possesses a low thermal capacity, i.e. which rapidly increases in temperature even with a small amount of absorbed energy.

Furthermore it must have a high thermal expansion coefficient as this feature results in a highly effective convective movement of the liquid vehicle.

For simplicity the liquid vehicle may be water, which however in the case of the present invention is not the ideal thermal vehicle, as in contrast with the general use made of water in primary circuits of solar collectors of the prior art.

Furthermore the total mass of the liquid vehicle must preferably be as small as possible in order to increase its temperature and actuate its circulation as much as possible for a given amount of absorbed heat. This also is in contrast with the prior art.

Liquids which are well suited to act as thermal vehicles according to the invention are, generally speaking, alcohols and mixtures thereof with water of the types used as anti-freezing liquids, as well as silicone oils and mixtures thereof having high fluidity. Mercury may also be employed as a suitable thermal vehicle liquid. A vast choice for these liquids is possible as long as they conform to the characteristics previously outlined.

When the plate 9 is transparent, said liquid vehicle may also contain either in suspension or dissolved therein, a black or dark pigment in order to enhance absorption of solar heat or it may also contain a colored pigment for purely aesthetic reasons.

In operation, absorbent panel 10 and/or plate 9 convert solar energy to thermal energy which is transferred to the liquid vehicle on the front side of passage 12, thus producing a differential of temperature and density with respect to the liquid vehicle on the rear side of passage 12. The liquid is driven in a clockwise direction, as viewed in FIG. 1, in the closed circuit formed by passage 12 and at the same time the liquid at lower temperature which was in contact with the water in vessel 1 through wall 11 is moved toward the front surface of panel 10. In this way, a thermo-convective movement of the liquid vehicle is established with a low thermal inertia and responsive to a minimum radiation, heat being taken from panel 10 in the path along the section of passage 12 facing outwards, said heat being transferred to the water in vessel 1 through wall 11 during the flow in the section of passage 12 which is facing inwards.

It should be noted at this point that solar collector 8, built as previously described, and separated from the water heater according to the invention, would per se be suited for alternative uses, such as for heating of volumes of air, by applying the device with an air tight seal in an appropriate opening or on an outside wall of a building so that said liquid vehicle transfers the heat absorbed by transformation of solar energy into thermal energy to the living quarters of an apartment placed on the side of wall 11. As an alternative any type of fluid can be heated with appropriate installation variations, for domestic or industrial use.

In order to avoid heat losses caused by inverse circulation (i.e. in counterclockwise direction in FIG. 1) of the liquid vehicle, in the passage 12 when the temperature of said liquid on the side of wall 11 is above that of the side of plate 9, a check valve 13 is provided on the inside of a section of passage 12, said valve being made of a strip of flexible material, relatively elastic, fixed with one edge to panel 10, such as to allow circulation in a clockwise direction of the liquid vehicle in one position of said valve 13 parallel to the flow direction of the liquid and to inhibit said circulation in the inverse direction (counterclockwise in FIG. 1) in the other valve's position transversal to said flow direction, thus blocking the way in passage 12.

Such flexible strip 13 is preferably placed on the upper or lower surface of panel 10, housed in a horizontal groove cut transversally with respect to the flow grooves. Said strip may be arcuately shaped near its free edge, so that an inverse flow of the liquid vehicle causes a lifting effect to be applied to the strip which tends to be positioned across said interspace thus blocking said flow.

As said valve 13 allows a heat transfer to be effective only one way from the outside towards the inside of the solar collector and not vice-versa, the solar collector according to the invention may well be defined as "thermal diode".

The solar collector according to the invention is characterized in that it has a total efficiency which is quite high with respect to the solar collectors of the prior art, due to the elimination of many factors leading to a low efficiency of heat exchange and a high thermal inertia.

The solar collector according to the invention allows to transfer solar energy to the exchange wall 11, not only when it is directly exposed to solar radiation, but also when the sun is hidden by clouds or is very low on the horizon.

Moreover, the solar collector according to the invention is further characterized in that the materials used for its construction are of low cost and it is simple to produce.

The invention is not limited to or by the example of the preferred embodiment described herein and it is intended that modifications and variations thereof are to be considered as falling within the scope of the invention.

What is claimed is:

1. A solar collector for heating a fluid by transforming solar radiation energy into thermal energy, comprising in combination:
   a body made of thermal insulating material having a reduced thickness with respect to the height and width thereof;
   a coating of impervious material tightly fitting on said body and which has front, rear, upper and lower surfaces, said coating being provided with grooves on said surfaces, said grooves having a substantially vertical direction at said front and rear surfaces;
   a plate of material which allows solar energy to be transferred from the one surface to the other surface thereof, said plate being juxtaposed on said front surface of said coating, substantially in contact with the peaks of said grooves, so that between said plate and said coating substantially vertical passages are defined;
   a supporting frame including walls juxtaposed on said upper, rear and lower surfaces of said coating, substantially in contact with the peaks of said grooves, so as to define passages between said walls and said surfaces, said supporting frame being formed in coincidence with said rear surface, of a good heat conducting material, said supporting frame being also fluid tight sealed with the side faces of said body and with the perimeter of said plate, said supporting frame being part of a housing which defines a closed chamber;
   a liquid having a low thermal capacity and a high thermal expansion coefficient, which fills said passages between the plate, the supporting frame and said coating;
   a check valve element, which in the one position allows flow of said liquid through said passages in an upward direction along said front surface and in a downward direction along said rear surface, while in the other position it inhibits a flow of said liquid in the opposite directions; and
   a fluid contained in said housing, in heat exchanging relationship with said wall of the supporting frame placed in coincidence of said rear surface of the coating,
whereby the radiating energy of the sun, transferred through said plate and absorbed as heat by said liquid, causes a temperature and volume differential to be established in said liquid, said differential driving a continuous flow of said liquid towards the heat exchanging wall of said supporting frame, resulting in a heaat transfer to the fluid contained in said housing, an inverse heat transfer process being inhibited by said check valve.

2. The solar collector according to claim 1, wherein said coating is more elastically deformable at its rear surface than at its front surface, in order to allow thermal expansion of said liquid.

3. The solar collector according to claim 1, wherein said check valve is a metal strip placed in a longitudinal groove of said upper or lower surface of the coating, a first edge of said strip closest to said plate being fixed to said coating and the second edge farthest away from said plate being free and said strip having an arcuate profile close to said second edge, so that a flow of said liquid directed from the second to the first edge causes the strip to be flexed bringing said second edge in contact with said supporting frame, thus blocking the flow of liquid.

4. The solar collector according to claim 1, wherein said plate is of a transparent material and the front surface of said coating is of a dark color.

5. The solar collector according to claim 4, wherein said liquid contains a dark colored pigment.

6. The solar collector according to claim 1, wherein said plate is of an opaque material with its front surface blackened.

7. The solar collector according to claim 1, wherein said liquid is a mixture of an alcohol and water.

8. The solar collector according to claim 1, wherein said liquid is a mixture of fluid silicone oils.

9. The solar collector according to claim 1, wherein said thermally insulating material is expanded polyurethane.

10. The solar collector according to claim 1, wherein an additional transparent plate supported by said supporting frame is placed in front of said first mentioned plate.

* * * * *

UNITED STATES PATENT AND TRADEMARK OFFICE
CERTIFICATE OF CORRECTION

PATENT NO. : 4,350,145
DATED : September 21, 1982
INVENTOR(S) : Giuliano Bianchini It is certified that error appears in the above-identified patent and that said Letters Patent is hereby corrected as shown below:

Front page, [73] Assignee, delete "Societa Italiana Brevetti, Rome, Italy".

Signed and Sealed this

Twenty-sixth Day of July 1983.

[SEAL]

Attest:

GERALD J. MOSSINGHOFF

Attesting Officer — Commissioner of Patents and Trademarks